(12) United States Patent
Goddard

(10) Patent No.: US 7,254,834 B2
(45) Date of Patent: Aug. 7, 2007

(54) FAULT TOLERANT FIREWALL SANDWICHES

(75) Inventor: Stephen M. Goddard, Lincoln, NE (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 872 days.

(21) Appl. No.: 10/274,344

(22) Filed: Oct. 18, 2002

(65) Prior Publication Data

US 2003/0131262 A1 Jul. 10, 2003

Related U.S. Application Data

(60) Provisional application No. 60/330,247, filed on Oct. 18, 2001.

(51) Int. Cl.
*H04L 29/00* (2006.01)
(52) U.S. Cl. .................................................. 726/11
(58) Field of Classification Search .................. None
See application file for complete search history.

(56) References Cited

U.S. PATENT DOCUMENTS

| | | | | |
|---|---|---|---|---|
| 5,473,599 A * | 12/1995 | Li et al. | ...................... | 370/219 |
| 5,826,014 A | 10/1998 | Coley et al. | ............ | 395/187.01 |
| 6,141,755 A | 10/2000 | Dowd et al. | ................. | 713/200 |
| 6,202,081 B1 | 3/2001 | Naudus | ....................... | 709/200 |
| 6,546,423 B1 * | 4/2003 | Dutta et al. | .................. | 709/225 |
| 6,801,949 B1 * | 10/2004 | Bruck et al. | ................. | 709/232 |
| 6,901,517 B1 * | 5/2005 | Redmore | ...................... | 726/11 |
| 6,973,023 B1 * | 12/2005 | Saleh et al. | .................. | 370/217 |
| 7,007,299 B2 * | 2/2006 | Ioele et al. | .................... | 726/14 |
| 2002/0040402 A1 * | 4/2002 | Levy-Abegnoli et al. | ... | 709/229 |

FOREIGN PATENT DOCUMENTS

EP 1 035 708 9/2000

OTHER PUBLICATIONS

Gan et al., "LSMAC vs. LSNAT: Scalable Cluster-Based Web Servers", Springer Netherlands, Sep. 2000, Retrieved from the Internet on May 24, 2006: <URL: http://www.springerlink.com/media/f01htlxtxk5226vrfl1y/contributions/w/2/p/q/w2pq22I758622200.pdf>.*

Yerxa, "RADWARE FireProof Balances Firewall Loads With Minimal Complexity", Apr. 1999, Retrieved from the Internet on May 24, 2006: <URL: http://www.networkcomputing.com/1007/1007r2.html>.*

International Search Report for International Application PCT/US02/33368.

Goddard, Steve et al., An Unavailability Analysis of Firewall Sandwich Configurations; University of Nebraska—Lincoln; pp. 1-10, Oct. 2001.

(Continued)

*Primary Examiner*—Gilberto Barron
*Assistant Examiner*—Minh Dinh
(74) *Attorney, Agent, or Firm*—Harness, Dickey & Pierce, P.L.C.

(57) ABSTRACT

Firewall sandwich configurations having improved levels of system availability as well as an application-space implementation of a firewall load balancer (FLB) which provides greater operational flexibility while reducing the need for custom hardware and/or operating system software. Also disclosed is a firewall capable of functionally replacing an FLB upon detecting a failure therein.

14 Claims, 4 Drawing Sheets

OTHER PUBLICATIONS

Goddard, Steve, Fault Tolerance in Firewall Sandwich Configurations; University of Nebraska—Lincoln; pp. 1-8, Apr. 2001.

Schroeder, Trevor et al., Scalable Web Server Clustering Technologies; IEEE Network; 14:3, pp. 38-45, May-Jun. 2000.

Alteon WebSystems, Inc., "Firewall Load Balancing", Jun. 1999, pp. 1-6.

Hamann, R., "Mehr Leistung Mit Firewall Load Balancing", Jan. 1, 2001, p. 80 and 81.

Cheng, L., et al., "Constructing High-Performance Firewall Load-Balancing Clusters: Practical Experience and Novel Ideas", Aug. 21, 2001, pp. 134-141.

* cited by examiner

FAULT TOLERANT FIREWALL SANDWICHES

CROSS-REFERENCE TO RELATED APPLICATION

Priority is hereby claimed to U.S. Provisional Application No. 60/330,247, filed Oct. 18, 2001, the entire disclosure of which is incorporated herein by reference.

FILED OF THE INVENTION

The present invention relates generally to computer network firewalls, and more particularly to fault tolerant firewall sandwiches.

BACKGROUND OF THE INVENTION

Firewalls are commonly used by organizations and, increasingly, individuals to protect computer networks from external threats including "hackers" coming from other networks, such as the Internet. A typical firewall inspects packets flowing across a network boundary and allows or denies access to internal/external servers according to defined policies. It thus forms the first line of defense in securing internal or private networks from, e.g., the Internet. However, in a single firewall system, the firewall represents a single point of failure; if the firewall is down, all access is lost. The single firewall may also create a throughput bottleneck.

Firewall sandwiches can be used to remove the single point of failure as well as the potential bottleneck of a single firewall. A typical firewall sandwich is illustrated in FIG. 1, and includes two or more (e.g., three) firewalls configured in parallel with firewall load balancers (FLBS) on opposite sides of the firewalls. The FLBs are logically positioned at network boundaries and ensure that TCP/IP traffic specific to a particular connection passes through the same firewall in both directions. Since connection requests may originate and terminate in either internal or external networks (illustratively labeled private network and public network, respectively, in FIG. 1), the two FLBs perform symmetric operations, especially if the firewalls do not perform network address translation (NAT).

The general operation of the firewall sandwich shown in FIG. 1 will now be described. For simplicity, assume that Ethernet is used for the physical network, the firewalls (FWs) do not perform network address translation, and all traffic is TCP/IP. Under these assumptions, the processing performed by the FLBs is symmetric with respect to the flow of traffic from the public network to the private network, and vice versa.

When the FLB positioned at the public network boundary receives a SYN packet from the public network (indicating a new TCP/IP session), the FLB selects a FW through which the session traffic will flow. Common algorithms for selecting a FW include predefined (static) selection based on IP and port numbers, Round Robin, Weighted Round Robin, Least Connections, and Least-Packet Throughput. The FLB forwards the packet to the selected FW by changing the Ethernet destination MAC address of the packet to the address of the selected FW. The FLB then changes the source MAC address to its own address and places the packet onto the subnet connecting the FLB to the set of FWs.

The selected FW receives the SYN packet and decides whether the packet (and the session) is allowed to pass based on defined security policies. Assuming the packet is allowed to pass through the FW, it is forwarded to the FLB on the other side of the sandwich. This is achieved by identifying such FLB as a network gateway for the subnet it shares with the FWs.

For connection-oriented protocols, such as TCP/IP, all packets for a given session are forwarded to the same FW (in both directions), unless the FWs share state information. Assuming the FWs do not share state information (as is the case for most commercially available FWs), when the SYN packet passes through the second FLB, the FLB recognizes it as having come from a FW, records the FW through which the packet passed and forwards the packet to its destination or to its next hop in the network. (Note that when static FW selection algorithms are used, the processing performed by the second FLB is reduced and may be bypassed completely in some cases.)

When the FLB positioned at the public network boundary receives a packet other than a SYN packet, it determines whether it is part of an existing TCP session. This is often done using the source and destination IP addresses and the respective port numbers. Assuming the packet belongs to an existing TCP session, the FLB forwards it to the correct FW. The FW then forwards the packet to the second FLB, and so on. If the packet does not belong to an existing TCP session, the first FLB either discards the packet, or discards the packet and replies with an RST packet, or forwards the packet to one of the FWs for deciding the packet's fate.

The simple FW sandwich depicted in FIG. 1 can typically tolerate the failure of any two of the three FWs. In general, such configurations maintain system availability as long as any one of the n FWs is operational. The loss of FWs may result in performance degradation, but not system failure, unless all n FWs fail. However, system failure also occurs if either FLB fails. Thus, while the firewall sandwich shown in FIG. 1 removes the firewall as the single point of failure, it creates two new points of failure: the FLBs on opposite sides of the firewalls. In fact, the firewall sandwich shown in FIG. 1 has a higher steady state unavailability value than a single firewall system.

One solution to this problem is to provide each FLB in FIG. 1 with a back-up or standby FLB, following the traditional primary-backup (or primary-copy) model of fault tolerance, as shown in FIG. 2. (For simplicity, redundant switches are not shown in FIG. 2, though they are commonly used.) In the event of a failure in one of the primary FLBs, its corresponding standby FLB will take over. A serial interface is often used for out-of-band communications between each primary FLB and its corresponding standby in order to maintain state in the standby FLB, and to detect failures in the primary FLB.

Alternatively, an active replication (or state machine) approach may be employed to maintain state in the standby FLBs. In that case, multicast switches are typically used to send the same messages to both the primary and standby FLBs. The standby FLB maintains the same state as the primary by processing the same packets in the same order. The standby FLB, however, only outputs packets when it detects a failure in the primary FLB. In a variation to this approach, the primary and standby FLBs may share the active load. If either the primary FLB or its standby FLB fails, the other FLB takes over the entire processing. This type of configuration, however, typically depends on extensions to the Virtual Router Redundancy Protocol (VRRP), and provides no more availability than the other primary/standby configurations mentioned above.

The concepts and technology behind FLB devices is based, at least in part, on research and development in the area of transparent network server clustering. Server clustering technologies are broadly classified as: OSI layer four switching with layer two packet forwarding (L4/2); OSI layer four switching with layer three packet forwarding (L4/3); and OSI layer seven (L7) switching with either layer two packet forwarding (L7/2) or layer three packet forwarding (L7/3) clustering. These terms refer to the techniques by which the servers in the cluster are tied together. An overview of these clustering technologies is presented in Schroeder, T., S. Goddard and B. Ramamurthy, Scalable Web Server Clustering Technologies, IEEE Network, Vol. 14, No. 3 pp. 38-45, 2000.

As recognized by the inventor hereof from a clustering point of view, balancing network connections over a set of firewalls (FWs) is similar to balancing connection requests over a set of network servers in an L4/2 server cluster. That is, all network traffic passing through the FW boundary must pass through an FLB before reaching the FWs; the FLB appears as a network gateway to servers and/or routers. One notable difference between server clustering and FW sandwiching is that the FW is not the final destination for network traffic. From a network packet's perspective, each FLB and the FW traversed by that packet appear as simply another hop in the network.

SUMMARY OF THE INVENTION

In order to solve these and other needs in the art, the inventor hereof has succeeded at designing several different firewall sandwich configurations each having improved levels of system availability, as well as an application-space implementation of a firewall load balancer (FLB) which provides greater operational flexibility while reducing the need for custom hardware and/or operating system software. The present invention also relates to a novel firewall capable of functionally replacing an FLB upon detecting a failure therein.

According to one aspect of the present invention, a computer-readable medium has computer-executable instructions recorded thereon for performing, in application-space, a method including receiving a packet from a computer network, selecting one of a plurality of firewalls for processing the packet, and forwarding the packet to the selected one of the firewalls.

According to another aspect of the invention, a system includes a plurality of firewalls, a first firewall load balancer (FLB) for exchanging packets between a first network and the plurality of firewalls, a second FLB for exchanging packets between a second network and the plurality of firewalls, and a first standby FLB configured to detect a failure in either one of the first FLB and the second FLB, and to functionally replace a corresponding one of the first FLB and the second FLB after detecting the failure.

According to a further aspect of the invention, a system includes a plurality of firewalls, a first FLB for exchanging packets between a first network and the plurality of firewalls, and a second FLB for exchanging packets between a second network and the plurality of firewalls. At least the first FLB is configured to both exchange packets between the first network and the plurality of firewalls, and exchange packets between the second network and the plurality of firewalls, after determining that a failure has occurred in the second FLB.

According to yet another aspect of the present invention, a system includes a plurality of firewalls, a first FLB for exchanging packets between a first network and the plurality of firewalls, and a second FLB for exchanging packets between a second network and the plurality of firewalls. At least one of the firewalls is configured to functionally replace the first FLB after detecting a failure therein.

Additional features and benefits of the present invention will be in part apparent and in part pointed out below.

BRIEF DESCRIPTION OF THE DRAWINGS

FIG. 8($b$) is a block diagram of the firewall sandwich of FIG. 8($a$) after a failed FLB is replaced by one of the firewalls.

Corresponding reference characters indicate corresponding features throughout the several views of the drawings.

DETAILED DESCRIPTION OF PREFERRED EMBODIMENTS

Figure 3:
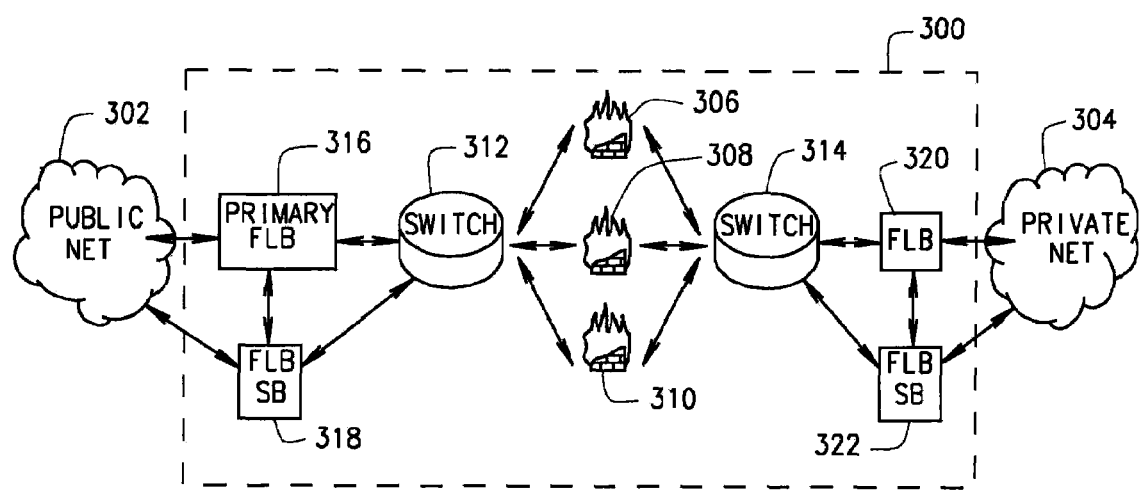
FIG. 3 is a block diagram of a firewall sandwich employing standby FLBs according to the present invention.

A fault tolerant firewall sandwich system according to one preferred embodiment of the present invention is illustrated in FIG. 3 and designated generally by reference character 300. As shown in FIG. 3, the system 300 provides a secure interface between a first computer network 302 and a second computer network 304. For illustrative purposes, the networks 302, 304 are identified in FIG. 3 as a "public" network (e.g., the Internet) and a "private" network (e.g., a LAN in a corporate setting). It should be understood, however, that the present invention may be used to interface computer networks of any type, regardless of whether such networks are characterized as public, private, or otherwise.

Figure 2:
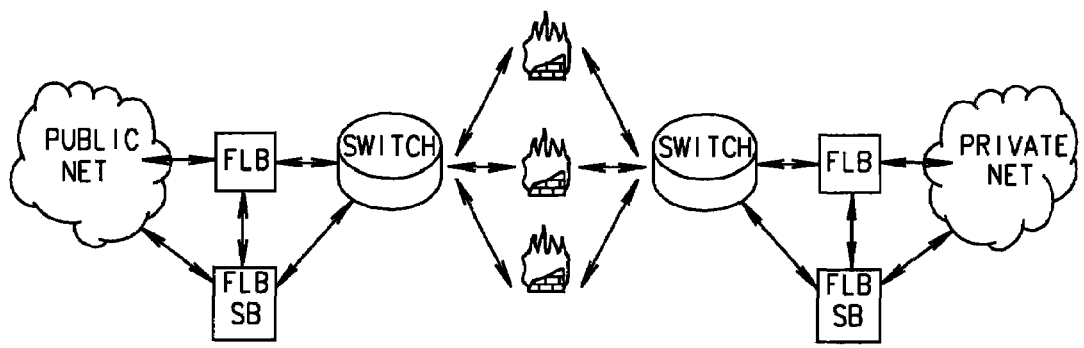
FIG. 2 is a block diagram of a prior art firewall sandwich employing standby firewall load balancers (FLBs).

With further reference to FIG. 3, the system 300 includes three firewalls 306, 308, 310 connected in parallel between two switches 312, 314. Connected between the switch 312 and the public network 302 is a primary FLB 316 as well as a standby FLB 318. Similarly, connected between the switch 314 and the private network 304 is a primary FLB 320 as well as a standby FLB 322. In the event of a failure in one of the primary FLBs 316, 320, the corresponding standby FLB 318, 322 assumes the responsibilities of the failed unit. Thus, the system 300 of FIG. 3 functions in a manner quite similar to the prior art system shown in FIG. 2. One notable difference between the systems of FIGS. 2 and 3 is that, in the system of FIG. 3, the functionality of at least one and preferably all the FLBs 316-322 are implemented entirely in application-space, as further explained below.

Software on a computer is generally characterized as either operating system (OS) software or applications. The OS software typically includes a kernel and one or more libraries. The kernel is a set of routines for performing basic, low-level functions of the OS such as interfacing with hardware. Applications are typically high-level programs that interact with the OS software to perform functions. The applications are said to execute in application-space. The functionality of a typical FLB can be implemented in the kernel, in applications, or in hardware. For the system 300 of FIG. 3, the FLB functionality is preferably implemented in application-space entirely. As such, in one embodiment, the FLBs 316-322 are implemented using commercially-off-the-shelf (COTS) hardware and COTS OS software. This is in contrast to custom hardware and/or OS software, which is typically more expensive and less flexible. While hardware devices may frequently outperform a software-based balancer, they offer much less operational flexibility. Moreover, the preferred application-space FLB, described below with reference to FIG. 4, has proven capable of meeting the needs of all but the busiest sites; most sites saturate their network bandwidth before the software-based balancer of the present invention would become the bottleneck.

Figure 4:
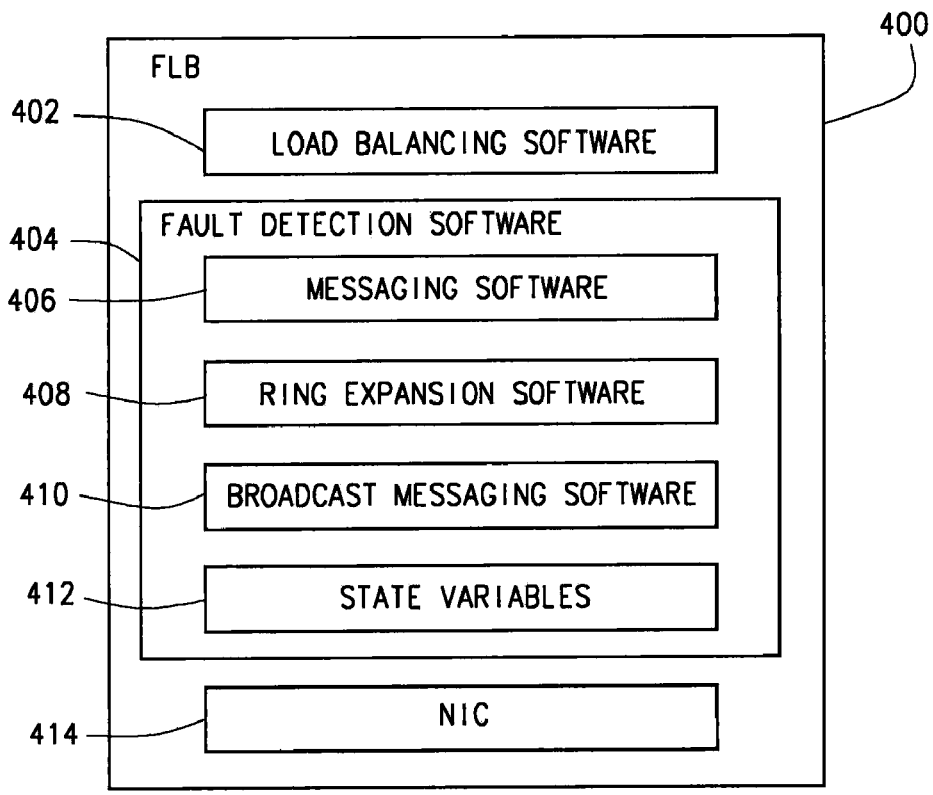
FIG. 4 is a block diagram of an application-space FLB according to the present invention.

An application-space FLB 400 according to one embodiment of the present invention is illustrated in FIG. 4. As shown therein, the FLB 400 includes load balancing software 402 and fault detection software 404, both of which execute in application-space. The load balancing software 402 preferably supports a variety of FW selection algorithms.

The FLB 400 can be configured to operate as, for example, one of the primary FLBs 316, 320 shown in FIG. 3, or as one of the standby FLBs 318, 322. In the latter case, the load balancing software 402 is not executed, or at least not fully executed, by the FLB 400 until the FLB takes over for one of the primary FLBs 316, 320.

The fault detection software 404 is provided to configure the FLB 400 as a member of a logical, token-passing, fault-tolerant ring network. For example, when the FLB 400 is operating as one of the standby FLBs 318, 322 of FIG. 3, the fault detection software 404 monitors one of the primary FLBs 316, 320 and, upon detecting a fault therein, triggers the load balancing software 402 to take over for the failed unit.

For the particular embodiment shown in FIG. 4, the fault detection software 404 includes messaging software 406 for coordinating creation and transmission of tokens by members of the ring. The messaging software 406 allows the ring members to create and transmit new packets (tokens) instead of waiting to receive the current packet (token). This allows for out-of-band messaging in critical situations such as failure of a primary FLB. The fault detection software 404 includes ring expansion software 408 for adapting to an addition to the ring of another device (this software extends the potential applications of the FLB 400, including those described below). The fault detection software 404 further includes broadcast messaging software 410 (including multicast or group messaging software) coordinating broadcast messaging among ring members. The fault detection software 404 also includes state variables 412.

As shown in FIG. 4, the FLB 400 also includes a network interface card (NIC) 414. In one preferred embodiment, the NIC 414 is placed in promiscuous mode to receive and process all packets routed past the FLB 400. In this manner, the FLB 400 will perform active replication when operating as a standby FLB, and will thereby maintain state by processing the same packets as its primary FLB. Alternatively, when operating in the standby FLB mode, the FLB 400 can maintain state and detect failures in a primary FLB using, for example, a serial interface to facilitate out-of-band connections with the primary FLB, a multicast switch for sending packets to the standby FLB in addition to the primary FLB, etc.

When operating in standby mode, the load balancing software 402 prevents the FLB 400 from outputting packets until the fault detection software 404 signals a failure in the primary FLB, thereby causing the load balancing software 402 to convert from standby FLB mode to primary FLB mode.

Additional details of the preferred load balancing software 402 and the fault detection software 404 are described (as "dispatch software" and "protocol software") in International Publication No. WO 02/43343.

While three firewalls are depicted in FIG. 3 (and FIGS. 5-8), it should be understood that a greater or lesser number of firewalls may be used in the present invention. It should also be noted that a variety of switch types are available for use as switches 308, 310. In one embodiment, the switches 308, 310 are local area network (LAN) switches. Additionally, other fault detection schemes may be used in lieu of the fault detection software 404 without departing from the scope of the invention.

The system 300 shown in FIG. 3 encounters system failure if either primary FLB 316, 320 and its respective standby FLB 318, 322 are both down, or if all FWs 306-310 fail (ignoring failures of the switches 312, 314).

Figure 5:
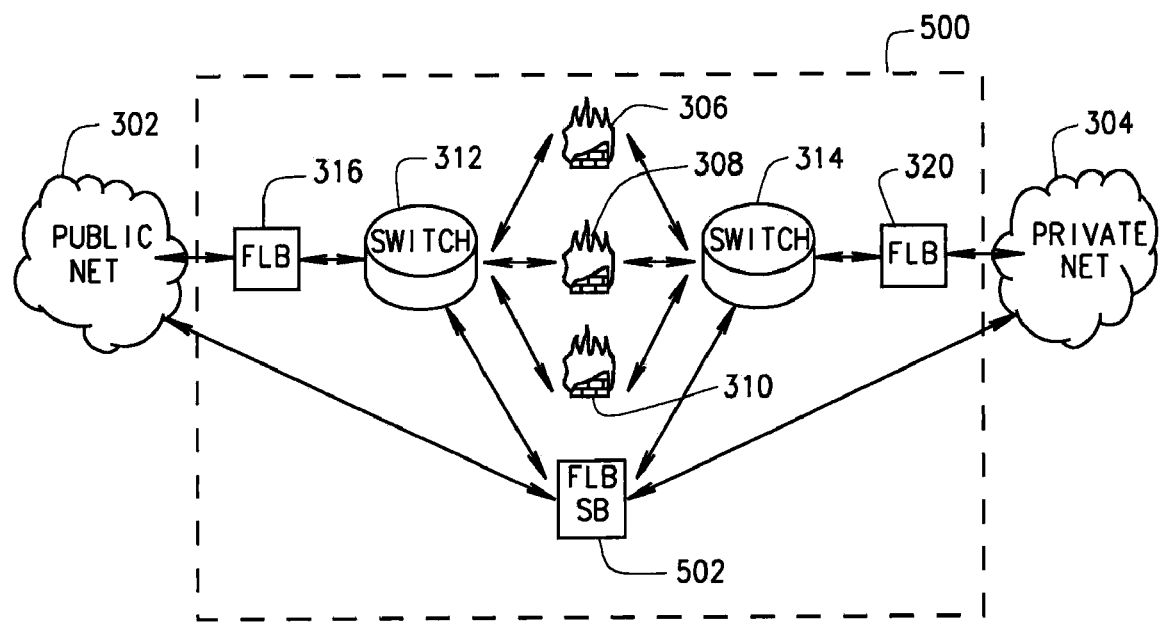
FIG. 5 is a block diagram of a firewall sandwich employing a shared standby FLB.

A fault tolerant firewall sandwich system 500 according to another preferred embodiment of the invention is shown in FIG. 5. The system 500 is identical to the system 300 of FIG. 3, except that the two standby FLBs 318, 322 of FIG. 3 are replaced by a single standby FLB 502 which serves as a back-up for both primary FLBs 316, 320. Thus, upon detecting a failure in one of the primary FLBs 316, 320, the standby FLB 502 will take the place, functionally, of the failed unit. One advantage of this configuration is that one less standby FLB is needed, as compared to the system 300 of FIG. 3, to achieve nearly the same level of system availability. Further, if the FWs 306-310 do not perform NAT, the single standby FLB 502 can maintain state consistency with both primary FLBs 316, 320 without performing any processing beyond that required of just one of the standby FLBs 318, 322 of FIG. 3. This is because the standby FLB 502 only needs to process packets from the private and public network interfaces to maintain the same state information as the primary FLBs 316, 320.

Each of the FLBs 316, 320, 502 shown in FIG. 5 can be implemented using the application-space FLB 400 described above with reference to FIG. 4. In such a case, the shared standby FLB 502 may be logically connected in a single fault-detection ring network with both primary FLBs 316, 320, or in a separate fault-detection ring network with each primary FLB 316, 320.

The system 500 shown in FIG. 5 encounters system failure if two of the three FLBs (including the shared standby FLB 502) are down or if all FWs 306-310 fail (again, ignoring failures of the switches 312, 314).

Figure 6:
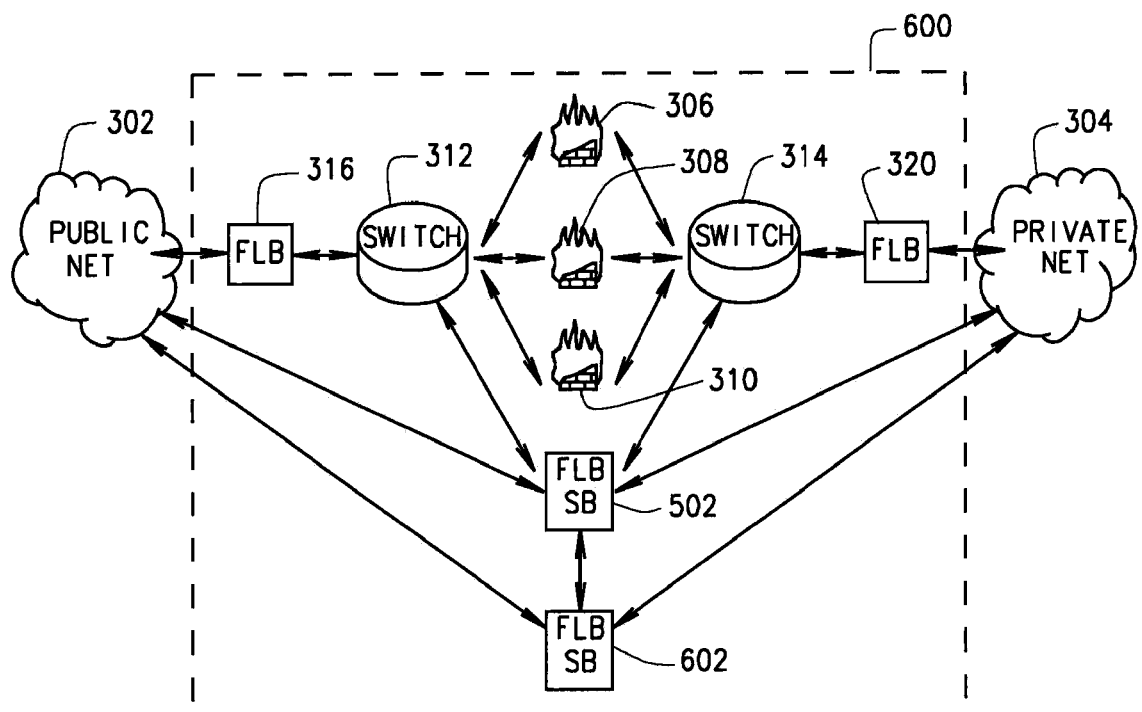
FIG. 6 is a block diagram of a firewall sandwich employing multiple shared standby FLBs.

A fault tolerant sandwich system 600 according to another preferred embodiment of the invention is shown in FIG. 6. The system 600 is identical to the system 500 of FIG. 5, except that an additional shared standby FLB 602 is provided. Thus, once the first shared standby FLB 502 takes over for one of the primary FLBs 316, 320 upon detecting a failure, the second shared standby FLB 602 takes over for the first shared standby FLB 502, and can thereafter take over for the next FLB that fails. One advantage of this configuration is that it can achieve a higher level of system availability than the system 300 of FIG. 3, while using the same number of FLBs. For even greater system availability, more than two shared standby FLBs can be provided in the system of FIG. 6.

Each of the FLBs 316, 320, 502, 602 shown in FIG. 6 can be implemented using the application-space FLB 400 described above with reference to FIG. 4. In such a case, the second shared standby FLB 602 is preferably connected in the same fault-detection ring network(s) as the first shared standby FLB 502.

The system 600 shown in FIG. 6 encounters system failure if three of the four FLBs (including the two shared standby FLBs 502, 602) are down or if all FWs 306-310 fail (again, ignoring failures of the switches 312, 314).

Figure 1:
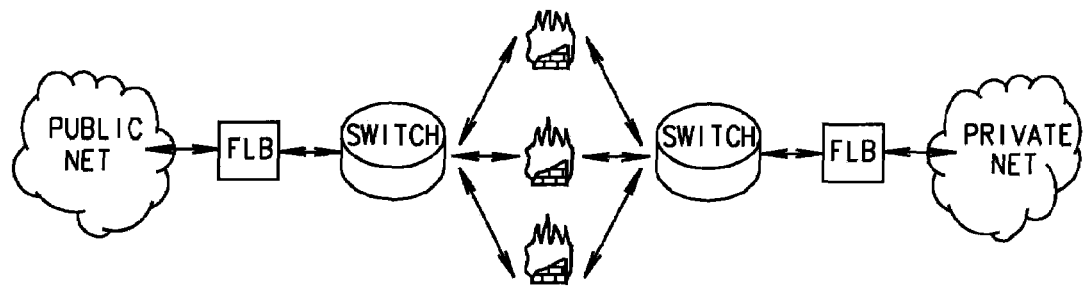
FIG. 1 is a block diagram of a prior art firewall sandwich.
Figure 7:
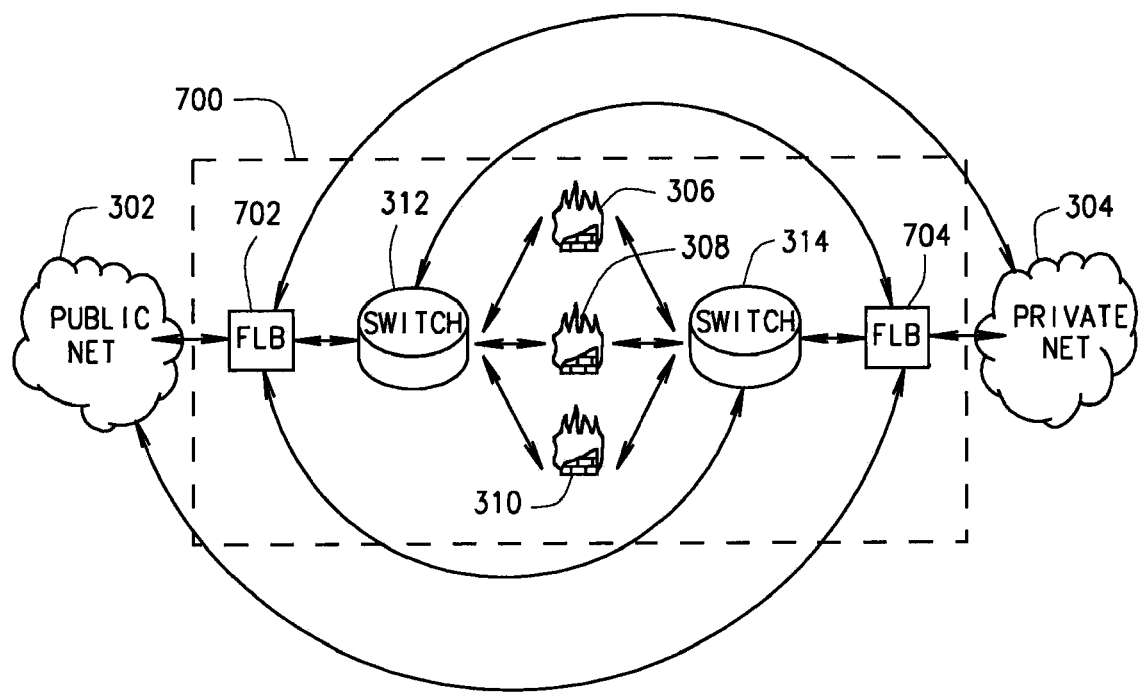
FIG. 7 is a block diagram of a firewall sandwich employing FLBs configured for operating in dual-FLB and single-FLB modes.

A fault tolerant sandwich system 700 according to yet another preferred embodiment of the invention is shown in FIG. 7. The system 700 appears largely the same as the prior art system of FIG. 1, which does not utilize standby FLBs. However, it employs FLBs 702, 704, each of which can take over for the other in the event of a failure. Initially, both FLBs 702, 704 preferably operate in a default dual-FLB mode, where each FLB 702, 704 functions like one of the FLBs in the prior art system of FIG. 1. However, when one of the FLBs 702, 704 detects a failure in the other, the "healthy" FLB switches from a dual-FLB mode to a single-FLB mode, where it performs the sandwiching operations previously performed by both FLBs 702, 704. From a physical configuration view, both FLBs 702, 704 are configured like the shared standby FLB 502 of FIG. 5. Each of the FLBs 702, 704 shown in FIG. 7 can be implemented using the application-space FLB 400 described above with reference to FIG. 4. In such a case, the two FLBs 702, 704 are preferably connected in a single fault-detection ring network.

The system 700 of FIG. 7 encounters system failure if both FLBs 702, 704 fail or if all FWs 306-310 fail (again, ignoring failures of the switches 702, 704). While the loss of one of the FLBs 702, 704 may result in a degradation of performance, it will not result in system failure.

For even greater system availability, one or more shared standby FLBs, like those depicted in FIGS. 5 and 6, can be provided in the system of FIG. 7. In such a system, a failure in one of the FLBs 702, 704 would result in the shared standby FLB taking over for the failed unit with no degradation of performance. A second FLB failure would result in the last "healthy" FLB switching from dual-FLB mode to single-FLB mode, with some degradation in performance likely. Non-shared standby FLBs may also be used to improve the availability of system 700.

Figure 8A:
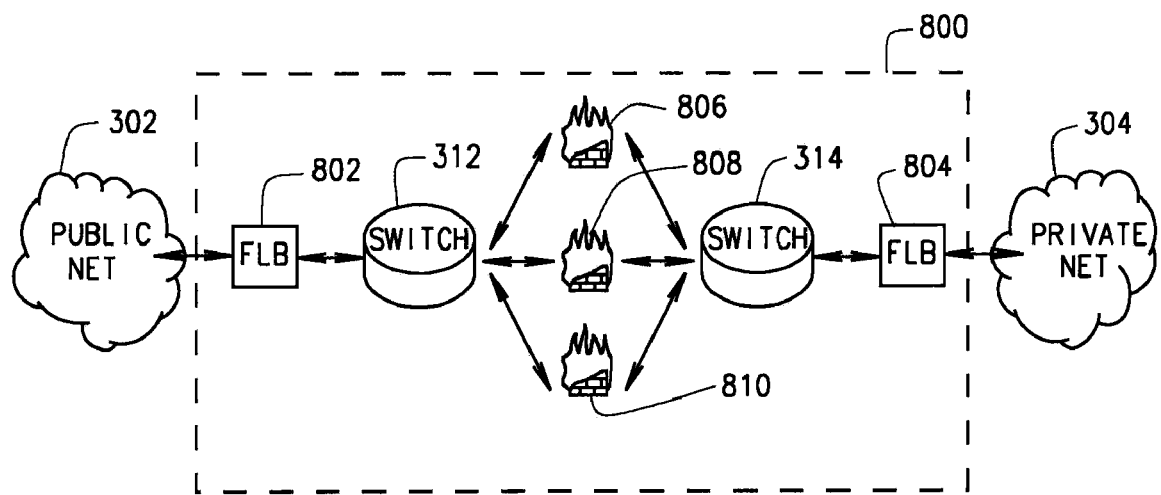
FIG. 8($a$) is a block diagram of a firewall sandwich employing firewalls configured for replacing a failed FLB.
Figure 8B:
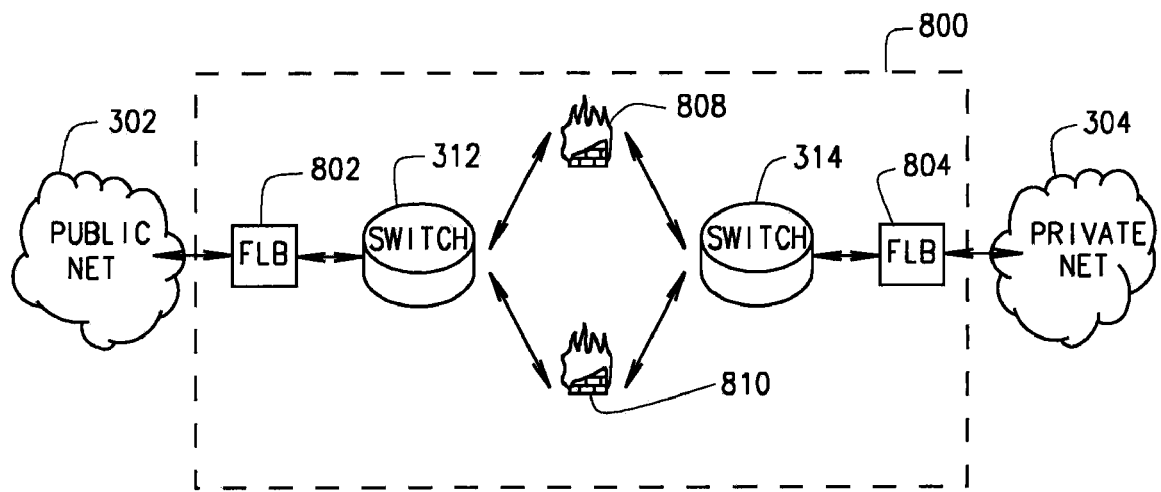

A fault tolerant sandwich system 800 according to yet another preferred embodiment of the invention is shown in FIG. 8(a). In addition to the switches 312, 314, the system 800 preferably includes two FLBs 802, 804 and three firewalls 806, 808, 810, and is preferably initially configured much like the system 700 of FIG. 7, as can be seen from FIG. 8(a). In the system 800, however, one and preferably all of the firewalls 806-810 execute fault detection software, and are connected in a fault detection network with the FLBs 802, 804. Upon detecting a failure in one of the FLBs 802, 804, the fault detection software preferably selects one of the firewalls 806-810 to replace the failed FLB. The fault detection software of the selected firewall then terminates firewall processing and launches the same (or similar) load balancing software as that previously executed by the failed FLB. In this manner, the firewalls 806-810 can be used to replace the FLBs 802, 804 as needed. An example of this is illustrated in FIG. 8(b), where a failure in the FLB 802 results in its replacement by FW 806, now serving as an FLB.

Preferably, the FLBs 802, 804 and the firewalls 806-810 each include load balancing software that supports the dual-FLB and single-FLB modes discussed above with reference to FIG. 7. In this manner, the system 800 can switch to the single-FLB mode after a certain number of failures have occurred. For example, if FLB 804 shown in FIG. 8(b) fails, FLB 806 can convert to the single-FLB mode, thereby maintaining two firewalls 808, 810 in the sandwich. The system 800 can also be configured to convert to a single firewall system, possibly reserving one or more standby firewalls, after a defined number of failures in the FLBs 802, 804 and/or firewalls 806-810 have occurred.

Each of the FLBs 802, 804 can be implemented using the application-space FLB 400 described above with reference to FIG. 4, as can the firewalls 806-810, provided the FLB 400 is augmented with appropriate software and/or hardware for implementing the required firewall functionality. In such a case, the two FLBs 802, 804 are preferably connected in a single fault-detection ring network together with the firewalls 806-810.

Although the firewalls depicted in FIGS. 3, 5, 6 and 7 have not been described as connected in fault-detection ring networks, it should be understood that preferably all firewalls are monitored for failures, either via the fault-detection ring networks described above, via additional ring networks, or otherwise. It should also be understood that while fault-detection ring networks constitute one preferred mechanism for detecting failures, other approaches may be employed. As an example, ping messages (e.g., ICMP messages) can be used to probe firewalls and FLBs for failures.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed:

1. A system comprising;
    a plurality of firewalls;
    a first FLB for exchanging packets between a first network and the plurality of firewalls;
    a second FLB for exchanging packets between a second network and the plurality of firewalls; and
    a first standby FLB configured to:
        detect a failure in the first FLB and functionally replace the first FLB, if a failure in the first FLB is detected; and
        detect a failure in the second FLB and functionally replace the second FLB, if a failure in the second FLB is detected.

2. The system of claim 1 wherein the first FLB and the second FLB are application-space FLBs.

3. The system of claim 2 wherein the application-space FLBs are embodied in COTS hardware executing COTS OS software.

4. The system of claim 1 further comprising a second standby FLB configured to functionally replace the first standby FLB upon detecting that the first standby FLB no longer serves a standby function for the first FLB and the second FLB.

5. A system comprising:
    a plurality of firewalls;

a first FLB for exchanging packets between a first network and the plurality of firewalls; and a second FLB for exchanging packets between a second network and the plurality of firewalls;

wherein at least the first FLB is configured to both exchange packets between the first network and the plurality of firewalls, and exchange packets between the second network and the plurality of firewalls, after determining that a failure has occurred in the second FLB.

6. The system of claim 5 wherein the second FLB is configured to both exchange packets between the first network and the plurality of firewalls, and exchange packets between the second network and the plurality of firewalls, after determining that a failure has occurred in the first FLB.

7. The system of claim 5 wherein the first FLB and the second FLB are application-space FLBs.

8. The system of claim 5 further comprising at least one standby FLB configured to functionally replace the second FLB upon determining that the failure has occurred in the second FLB.

9. The system of claim 8 wherein the first FLB is configured to both exchange packets between the first network and the plurality of firewalls, and exchange packets between the second network and the plurality of firewalls, after determining that the failure has occurred in the second FLB and a failure has occurred in the standby FLB.

10. The system of claim 5 further comprising at least one standby FLB configured to functionally replace the first FLB upon determining that a failure has occurred in the first FLB.

11. The system of claim 5 further comprising at least one standby FLB configured to determine whether a failure has occurred in either one of the first FLB and the second FLB, and to functionally replace the corresponding one of the first FLB and the second FLB upon determining that the failure has occurred.

12. A system comprising:

a plurality of firewalls:

a first FLB for exchanging packets between a first network and the plurality of firewalls: and a second FLB for exchanging packets between a second network and the plurality of firewalls:

wherein each of the firewalls execute fault detection software such that each of the firewalls is configured to functionally replace the first FLB after detecting a failure in the first FLB, the fault detection software selecting a firewall from the plurality of firewalls to replace the first FLB.

13. The system of claim 12 wherein each of the firewalls is configured to functionally replace either one of the first FLB and the second FLB after detecting a failure in a corresponding one of the first FLB and the second FLB.

14. The system of claim 12 wherein said one of the firewalls is configured to functionally replace either one of the first FLB and the second FLB after detecting a failure in a corresponding one of the first FLB and the second FLB.

* * * * *